United States Patent [19]

Bournonville et al.

[11] 4,431,574

[45] Feb. 14, 1984

[54] SUPPORTED GROUP VIII NOBLE METAL CATALYST AND PROCESS FOR MAKING IT

[75] Inventors: Jean-Paul Bournonville, Chatou; Jean Cosyns, Maule; Strinivasan Vasudevan, Paris, all of France

[73] Assignee: Institut Francais du Petrole, Rueil-Malmaison, France

[21] Appl. No.: 375,068

[22] Filed: May 5, 1982

[30] Foreign Application Priority Data

May 5, 1981 [FR] France ................................ 81 09055

[51] Int. Cl.³ ......................... B01J 23/42; B01J 23/46
[52] U.S. Cl. .................................. 502/261; 502/332; 502/334; 585/273
[58] Field of Search ............. 252/460, 466 PT, 455 R; 585/273

[56] References Cited

U.S. PATENT DOCUMENTS 3,943,053  3/1976  Kovach et al. .................. 585/273 X
4,093,559  6/1978  Fernholz et al. ............. 252/466 PT

FOREIGN PATENT DOCUMENTS 401395  2/1974  U.S.S.R. ........................... 252/466 J

*Primary Examiner*—W. J. Shine
*Attorney, Agent, or Firm*—Millen & White

[57] ABSTRACT

Group VIII noble metal catalysts, useful for hydrogenation, are manufactured by:
(a) -impregnating a catalyst carrier with a solution of a group VIII noble metal acetylacetonate in an organic solvent, and
(b) -heating the impregnated carrier in an oxygen atmosphere.

20 Claims, No Drawings

SUPPORTED GROUP VIII NOBLE METAL CATALYST AND PROCESS FOR MAKING IT

BACKGROUND OF THE INVENTION

The use of noble metals with great activity being costly, attempts have been made to have them as highly dispersed on a carrier as possible, to make nearly all the atoms of the metal accessible to the reactants (atomic dispersion). In practice, when using conventional methods of manufacture, for example impregnation with a salt of the selected metal, it is difficult to obtain very high degrees of dispersion. Relatively big metal crystallites are obtained, with a diameter which is often larger than 30 Å ($30 \times 10^{-10}$ m).

As relates to bifunctional catalysts having an acid function and a metal function, such as, for example, reforming or hydrocracking catalysts, ionic exchange methods have been found, which provide very high metal dispersions.

Unhappily the carriers to be used are generally of large surface: alumina of the gamma cubic type with a specific surface of about 200 m$^2$/g, silica-aluminas or zeolites with even higher surfaces. Moreover it is necessary in these methods to use competing ions such as the chloride ion from hydrochloric acid which is used, for example, for manufacturing reforming catalysts. These competing ions avoid a chromatographic effect when impregnating the catalyst particle and thus lead to a homogeneous distribution of the metal within the particle. The residual presence of some of these competitor ions on the catalyst surface, and the usually acidic properties of the large surface carriers make these catalysts unsuitable to hydrogenation and dehydrogenation reactions since they have a low selectivity and also activate parasitic reactions of polymerization, isomerization and hydrocracking.

More recently, techniques have been found to graft organometallic complexes on inorganic or polymeric substrates. This type of technique has been called supported homogeneous catalysis. These methods lead easily to atomic dispersions of the metal phase. However they cannot be used easily and they often necessitate the use of reducers, such as organoaluminum compounds, which leave residues on the terminated catalyst which can activate parasitic reactions. The use of polymeric carriers results in swelling when hydrocarbons are present; and these catalytic systems are not regenerable by the conventional combustion methods.

The technique of the invention copes with these difficulties. It results in very high metal dispersions, such that at least 50% of the deposited metal atoms are accessible to the reactants, which is estimated to correspond to crystallites of a size smaller than 20 Å ($20 \times 10^{-10}$ m).

SUMMARY OF THE INVENTION

The process for manufacturing catalysts according to the invention, is characterized by the following steps:
  (a) a catalyst carrier is contacted with a solution of at least one acetylacetonate of a group VIII noble metal in a solvent, so as to introduce said metal into said carrier, and
  (b) the metal-impregnated carrier from step (a) is heated to 100°–400° C. in the presence of a molecular oxygen containing gas, so as to remove the hydrocarbon and activate the impregnated carrier.

The active catalyst is obtained by treating the product of step (b) with hydrogen at a temperature of 50°–450° C. This treatment may immediately follow step (b) or it may be effected later, by the user.

The carriers to be used may be selected, for example, from among the silicas, aluminas and silica-aluminas with specific surfaces of from 5 to 500 m$^2$/g and preferably higher than 20 m$^2$/g. The preferred carriers have the shape of agglomerates, for example balls or extrudates.

The metals to be used are essentially group VIII noble metals, such as ruthenium, rhodium, palladium, iridium and platinum. Their content in the finished catalyst may range from 0.05 to 2% b.w.

The invention, in a particular embodiment, consists of depositing the metal on the carrier from a slution of the corresponding metal acetylacetonate in a hydrocarbon. The hydrocarbon is so selected that it can be easily removed thereafter by vaporization, without excessive heating, for example at a temperature not in excess of 200° C. Aliphatic or cycloaliphatic hydrocarbons, for example, heptane, cyclohexane or iso-octane, may be used. However the hydrocarbon is preferably an aromatic hydrocarbon, such as benzene, toluene, xylenes, ethylbenzene, propylbenzene or isopropylbenzene since these hydrocarbons are better solvents for the acetylacetonate. Other useful solvents are, for example, alcohols, for example methanol or ethanol, ketones, for example acetone or acetylacetone, or halogenated hydrocarbons, for example chloroform or methylene chloride.

The carrier is preferably immersed in the solution of the selected acetylacetonate (or mixture of acetylacetonates). The method may be the "dry method", the volume of solution being substantially equal to the total pore volume of the carrier; however an excess of solution is preferably used. In that case, the volume of the solution may amount to 2 to 10 times the pore volume.

The impregnation can be performed at a temperature of, for example, 0° to 150° C., and preferably at a temperature from 10° to 50° C. A slow fading of the acetylacetonate solution is surprisingly often observed, which indicates a complexing of the noble metal acetylacetonate with the carrier. After a while, the solution can even be fully discolored and it can be found by titration that practically all the metal has disappeared from the solution.

The solution in excess, if any, is then removed and the carrier containing the complexed metal and the solvent retained in its pores is dried at a temperature of, for example, 50° to 200° C., preferably 100° to 150° C., so as to remove the solvent present in the pores. If necessary, a subatmospheric pressure can be used.

The catalyst, at this stage of its manufacture, is inactive or has only a low activity; it is then necessary to subject it, before use, to an additional activation treatment. This treatment, which can sometimes be the same as the drying treatment but which, in most cases, comes after it, consists of heating the catalyst to 100°–400° C. in the presence of molecular oxygen; a stream of air is, for example, passed through the catalyst.

The optimum conditions of this thermal treatment depend on the selected noble metal. The optimum is effectively 200° to 400° C. for palladium, iridium and rhodium and 100° to 200° C. for ruthenium. Platinum does not appear to have an optimum temperature. The treatment with molecular oxygen is followed with a hydrogen treatment which can be usefully performed at 50°–450° C., preferably 100°–340° C.

The drying and oxygen-activation treatment may last, for example, from 30 mm to 10 h, preferably 1 to 4 h.

These times may also be used in the subsequent hydrogen treatment.

The dispersion rate of the final catalyst can be determined by various techniques mainly gas chemisorption determinations and transmission electron microscopy. The principle of the gas chemisorption methods consists of selectively chemisorbing a gas, such as, for example, hydrogen, carbon monoxide or oxygen on the metal, since the carrier does not absorb the gas under correctly selected conditions. This type of determination is well-known and it is therefore unnecessary to describe it in detail.

Once the amount chemisorbed and the stoichiometry of the chemisorption (number of molecules of adsorbed gas per atom of the exposed metal) are known, the dispersion can be determined, i.e. the percentage of exposed metals with respect to the total number of atoms in the catalyst.

Starting from this value of the dispersion and assuming that the metal crystallizes in the crystalline system that it possesses in the solid state, an average value of the crystallite diameter may be calculated. This value may be compared to that obtained by electron microscopy. However the latter technique does not detect crystallites with a diameter lower than 10 Å ($10^{-9}$ m). For higher diameters, the values calculated from the chemisorption and the average values obtained with the microscope are generally in approximate agreement.

For catalysts having a metal dispersion, determined by chemisorption, of about 100%, the fact that no crystallites are seen in the microscope is qualitative proof of a very high dispersion.

The catalysts thus prepared and characterized have, when compared with conventional catalysts, a substantially higher activity in the hydrogenation of olefins and aromatics, in the dehydrogenation of cycloparaffins with 6 carbon atoms and in the hydrogenolysis of paraffins.

The following non-limitative examples illustrate the present invention.

The hydrogenation reactions are commonly performed at a temperature from 0° to 200° C., under a pressure from 1 to 100 bars, these values constituting no limitation; they depend particularly on the type of hydrocarbon to be hydrogenated and the nature of the carrier and the active metal.

EXAMPLE 1

The selected carrier is alumina as balls of a 2 to 4 mm diameter, with a specific surface of 70 m²/g, a total pore volume of 0.6 cc/g and an average pore diameter of 200 Ångströms ($200 \times 10^{-10}$ m).

This carrier is introduced into 3 times its volume of a benzenic solution of palladium acetylacetonate, the concentration thereof being selected to obtain 0.3% b.w. of palladium on the finished catalyst. After repose for 8 hours, the supernatant solution is analysed and found to contain about 100 ppm of palladium b.w., which shows that nearly all the acetylacetonate has been complexed on the carrier.

The supernatant solution is removed and the catalyst is dried in an aerated oven at 120° C. for 6 hours. The catalyst is then transferred into a tubular furnace where it is maintained in an air stream for 2 hours at 300° C.

After cooling, a sample of the so-prepared catalyst is introduced into a chemisorption cell and reduced at 100° C. for 2 hours in a stream of hydrogen at atmospheric pressure.

After scavenging with an argon stream, the amount of chemisorbed carbon monoxide is determined by the "pulse" method and by chromatographic analysis at the output of the cell. The dispersion is calculated by assuming that one exposed metal atom adsorbs one molecule of CO. The same method has been used in the examples 2 to 13.

Another sample of the same catalyst has been analysed by X-ray fluorescence and a 0.29% b.w. content of palladium has been found in the finished catalyst.

A third sample has been reduced with hydrogen at 100° C. for 2 h and examined by electron microscopy. The dispersion and the average diameter of the crystallites are summarized in table I.

EXAMPLE 2 (COMPARISON)

A catalyst is prepared in the same manner as in example 1, except that the calcination temperature is 500° C. instead of 300° C.

The final catalyst is reduced at 100° C. for 2 hours and also characterized by CO chemisorption and electron microscopy. The results are given in table I.

EXAMPLE 3 (COMPARISON)

A catalyst is prepared in the same manner as in example 1. However the reduction is performed at 500° C. for 2 h, instead of 100° C., and the so-treated catalyst is characterized by chemisorption and microscopy. The values are summarized in table I.

EXAMPLE 4

A catalyst is prepared by the method of example 1 with the use of α-alumina having a surface of 14 m²/g, a total pore volume of 0.42 cc/g and an average pore diameter of 1000 Ångströms ($10^{-7}$ m).

This carrier is impregnated, as in example 1, with a benzenic solution of palladium acetylacetonate whose concentration is calculated to obtain a 0.3% content of palladium in the finished catalyst.

The operation is then continued as in example 1. The analysis of the catalyst gives a 0.28% b.w. content of palladium.

The finished catalyst is reduced with hydrogen at 100° C. and analysed by CO chemisorption and electron microscopy (see Table I).

EXAMPLE 5 (COMPARISON)

A catalyst is prepared as in example 4, except that the calcination is performed at 500° C. for 2 hours.

After reduction at 500° C. for 2 hours, the metal dispersion is characterized by CO chemisorption and electron microscopy (see Table I).

EXAMPLE 6 (COMPARISON)

The same carrier as in example 1 is impregnated with an aqueous solution of palladium nitrate, the volume of solution equalling the pore volume of the carrier.

The amount of palladium in the solution represents 0.3% b.w. of the carrier.

The catalyst is then dried and calcined at 300° C. for a sufficient time to obtain a complete decomposition of the nitrate, i.e. 4 hours.

After reduction at 100° C. for 2 h, the catalyst is characterized by CO chemisorption and electron microscopy (see Table I).

EXAMPLE 7

In this example, the carrier is silica in the form of balls of 3–5 mm diameter, with a specific surface of 90 m$^2$/g, a total pore volume of 0.77 cc/g and an average pore diameter of 170 Angströms (170×10$^{-10}$ m).

The carrier is immersed in a benzenic solution of palladium acetylactonate, as in example 1. After 24 hours of repose, the operation is performed as in example 1.

The catalyst contains 0.28% b.w. of palladium and is characterized as in the other examples (see Table I).

EXAMPLE 8

A catalyst is prepared in the same manner as in example 1, except that the alumina carrier has a specific surface of 170 m$^2$/g, a total pore volume of 1 cc/g and an average pore diameter of 120 Angströms (120×10$^{-10}$ m), and that 0.5% b.w. of palladium is introduced. The volume of the solution amounts to three times the pore volume.

In that case, after a 2 hours calcination at 300° C. in an air stream, in a tubular furnace, a catalyst sample of known weight is inroduced into the chemisorption cell and reduced with hydrogen for 2 h at 400° C. The results of the titrations and the values of the dispersion and average diameter of the crystallites are given in table I.

EXAMPLE 9

A catalyst is prepared as in example 8, except that the volume of the impregnation solution is the same as the total pore volume of the alumina carrier (dry impregnation).

After drying, calcination in the air at 300° C. (2 h) and reduction in H$_2$ at 400° C. (2 h), the metal dispersion, determined by CO chemisorption, amounts to 80%.

This example shows the superiority of the impregnation technique using an excess of solution (see example 8).

EXAMPLE 10

A catalyst sample, identical to that of example 8, is subjected to a direct reduction at 400° C. (2 h) after drying/activation in the air at 120° C. (2 h). The resultant dispersion (68%) is substantially lower than that of the catalyst prepared and activated according to the technique of example 8, which shows the advantage of working at an activation temperature of 200°–400° C., as in the case of palladium.

EXAMPLE 11 (COMPARISON)

Example 8 is repeated, except that the calcination in air is performed at 500° C. After reduction at 400° C., the dispersion is far lower than in example 8:54% instead of 100%.

EXAMPLE 12 (COMPARISON)

A catalyst sample, identical to that of example 8, is reduced at 500° C. (2 h) after calcination at 300° C. (2 h). The dispersion decreases from 100% (example 8) to 55%. This unfavorable result can be interpreted as follows: the high temperature reduction results in a decrease of the metal surface by aggregation of the superficial metal species as crystallites of greater size.

EXAMPLE 13 (COMPARISON)

A catalyst containing palladium on the same carrier as used in example 8 is prepared by impregnation of said carrier with an aqueous solution of palladium chloride. The catalyst contains 0.5% b.w. of palladium. The dispersion obtained after calcination in air at 300° C. (2 h) and reduction at 400° C. (2 h) amounts to 32%. Thus the use of a conventional impregnation technique with a water soluble compound does not lead to high dispersion.

EXAMPLE 14

A catalyst of platinum deposited on alumina identical to that of example 8 is prepared.

The platinum impregnation is performed by immersion of a known quantity of carrier in a benzenic solution of platinum acetylacetonate whose volume is three times the pore volume of the carrier and whose concentration is calculated to obtain a platinum content of about 0.5% in the final catalyst. The other operations of discharge of the impregnation solution, drying and activation are similar to those of example 1.

After drying, the catalyst is calcined in air for 2 h at 300° C., and then reduced with hydrogen at 400° C. for two further hours. The results are given in table II. The metal dispersion is determined by hydrogen chemisorption, assuming that one exposed metal atom chemisorbs one hydrogen atom. This method has also been used in examples 15 to 26.

EXAMPLE 15

A catalyst is prepared as in example 14, except that the reduction temperature is 300° C. The resultant dispersion is 70%.

EXAMPLE 16

A catalyst is prepared as in example 14, except that the catalyst is only subjected to drying at 120° C. for 2 h before reduction at 400° C.: the resultant dispersion is 100%.

EXAMPLE 17 (COMPARISON)

A catalyst of platinum carried on the alumina of example 8 is prepared by impregnation of the alumina carrier with an aqueous solution of hexachloroplatinic and hydrochloric acids. The respective concentrations of the two acids in the impregnation solution are caculated to give 0.5% platinum and 1.3% chlorine contents.

After drying at 120° C. for 2 h followed with reduction at 400° C. for 2 h, the catalyst dispersion amounts to 45%.

EXAMPLE 18

A catalyst is prepared as in example 8, except that rhodium acetylacetonate is used, instead of palladium acetylacetonate. The rhodium acetylacetonate concentration in the impregnation solution is calculated to introduce about 1% b.w. of metal into the final catalyst.

After calcination at 300° C. for 2 h and reduction at 300° C. for 2 h, the catalyst has a dispersion of 93% (see Table II).

EXAMPLE 19 (COMPARISON)

A catalyst of rhodium deposited on a carrier identical to that of example 8 has been manufactured by impregnation of said carrier with an aqueous solution of hydrochloric acid and rhodium trichloride.

After calcination in the air at 300° C. for 2 h and reduction at the same temperature for 2 h, the metal dispersion amounts to 81%. The results are given in Table II.

EXAMPLE 20

A catalyst is prepared in the same manner as in example 8, except that palladium acetylacetonate is replaced with iridium acetylacetonate. After calcination in air at 300° C. for 2 hours and reduction at 400° C. for 2 h, a dispersion of 100% is obtained.

EXAMPLE 21 (COMPARISON)

A catalyst is prepared in the same manner as in example 20, except that the catalyst is subjected to calcination at 500° C. before the reduction at 400° C. The metal dispersion is 19%.

EXAMPLE 22 (COMPARISON)

A catalyst of iridium carried on the same alumina as used in example 8 is manufactured, except that the impregnation is effected with an aqueous solution of hydrochloric and hexachloroiridic acids.

After calcination at 300° C. (2 h) and reduction at 400° C. (2 h), the metal dispersion is 55%.

EXAMPLE 23

A catalyst of ruthenium on alumina is manufactured in the same manner as in example 8, by impregnating the carrier with a benzenic solution of ruthenium actylacetonate.

After filtration and drying at 120° C. for 2 hours, the catalyst is reduced at 300° C. for 2 h; the resultant dispersion is 100%.

EXAMPLE 24

Example 23 is repeated, except that the reduction is performed at 400° C. The dispersion is also 100%.

EXAMPLE 25 (COMPARISON)

A catalyst identical to that of example 23 is reduced at 300° C. (2 h) after calcination in air at 500° C. (2 h). The dispersion is only 9%.

EXAMPLE 26 (COMPARISON)

The manufacture of a ruthenium-containing catalyst is performed by impregnation with an aqueous solution of hydrochloric acid and ruthenium trichloride. After drying at 120° C. and reduction at 400° C., the metal dispersion amounts to 57%.

TABLE I

| CATALYST | | CARRIER | SURFACE (m²/g) | CALCINATION TEMPERATURE (°C.) | REDUCTION TEMPERATURE (°C.) | METAL | PRECURSOR | % b.w | DISPERSION (%) | DIAMETER BY CHEMISORPTION Å | DIAMETER BY MICROSCOPY Å |
|---|---|---|---|---|---|---|---|---|---|---|---|
| Example | 1* | Al₂O₃ | 70 | 300 | 100 | Pd | Ac.Ac | 0.29 | 95 | 6 | <10 |
| | 2 | Al₂O₃ | 70 | 500 | 100 | Pd | Ac.Ac | 0.29 | 50 | 15 | 18 |
| | 3 | Al₂O₃ | 70 | 300 | 500 | Pd | Ac.Ac | 0.29 | 30 | 25 | 30 |
| | 4* | Al₂O₃ | 14 | 300 | 100 | Pd | Ac.Ac | 0.28 | 85 | 7 | <10 |
| | 5 | Al₂O₃ | 14 | 500 | 500 | Pd | Ac.Ac | 0.28 | 15 | 60 | 65 |
| | 6 | Al₂O₃ | 70 | 300 | 100 | Pd | Nitrate | 0.30 | 32 | 23 | 28 |
| | 7* | SiO₂ | 90 | 300 | 100 | Pd | Ac.Ac | 0.28 | 99 | <6 | <10 |
| | 8* | Al₂O₃ | 170 | 300 | 400 | Pd | Ac.Ac | 0.50 | 100 | <6 | <10 |
| | 9* | Al₂O₃ | 170 | 300 | 400 | Pd | Ac.Ac | 0.50 | 80 | 8 | <10 |
| | 10* | Al₂O₃ | 170 | 120 | 400 | Pd | Ac.Ac | 0.50 | 68 | 13 | 16 |
| | 11 | Al₂O₃ | 170 | 500 | 400 | Pd | Ac.Ac | 0.50 | 34 | 27 | 30 |
| | 12 | Al₂O₃ | 170 | 300 | 500 | Pd | Ac.Ac | 0.50 | 35 | 27 | 30 |
| | 13 | Al₂O₃ | 170 | 300 | 400 | Pd | Chloride | 0.50 | 32 | 29 | 33 |

*Catalysts prepared by the method of the invention
1 Å = 10⁻¹⁰ m
AcAc = acetylacetonate

TABLE II

METAL DISPERSION OF THE CATALYSTS OF Pt, Ir, Rh, Ru carried on Al₂O₃

| CATALYST | CARRIER | SURFACE (m²/g) | CALCINATION TEMPERATURE (°C.) (2 hours) | REDUCTION TEMPERATURE (°C.) (2 hours) | METAL | PRECURSOR | % b.w. | DISPERSION (%) | AVERAGE DIAMETER BY CHEMISORPTION Å |
|---|---|---|---|---|---|---|---|---|---|
| Example 14* | Al₂O₃ | 170 | 300 | 400 | Pt | AcAc | 0.50 | 100 | <10 |
| Example 15* | Al₂O₃ | 170 | 300 | 300 | Pt | AcAc | 0.48 | 70 | 13 |
| Example 16* | Al₂O₃ | 170 | 120 | 400 | Pt | AcAc | 0.52 | 100 | <10 |
| Example 17 | Al₂O₃ | 170 | 120 | 400 | Pt | H₂PtCl₆ | 0.51 | 45 | 22 |
| Example 18* | Al₂O₃ | 170 | 300 | 300 | Rh | AcAc | 0.92 | 93 | 10 |
| Example 19 | Al₂O₃ | 170 | 300 | 300 | Rh | RhCl₃ | 0.96 | 91 | 12 |
| Example 20* | Al₂O₃ | 170 | 300 | 400 | Ir | AcAc | 0.50 | 100 | <10 |
| Example 21 | Al₂O₃ | 170 | 500 | 400 | Ir | AcAc | 0.48 | 19 | 50 |
| Example 22 | Al₂O₃ | 170 | 300 | 400 | Ir | H₂IrCl₆ | 0.52 | 55 | 13 |
| Example 23* | Al₂O₃ | 170 | 120 | 300 | Ru | AcAc | 0.51 | 100 | <10 |
| Example 24* | Al₂O₃ | 170 | 120 | 400 | Ru | AcAc | 0.50 | 100 | <10 |
| Example 25 | Al₂O₃ | 170 | 500 | 300 | Ru | AcAc | 0.46 | 9 | 100 |
| Example 26 | Al₂O₃ | 170 | 120 | 400 | Ru | RuCl₃ | 0.51 | 57 | 14 |

*Catalysts prepared by the process of the invention.

EXAMPLE 27

The catalysts prepared in the examples 1 to 8 and 13 are used to hydrogenate a cut of olefinic hydrocarbons with 4 carbon atoms.

The composition of the cut is:

| Compound | % by weight |
|---|---|
| 1-butene | 28 |
| cis 2-butene | 8 |
| tr 2-butene | 13 |
| butadiene | 0.3 |
| isobutene | 44.2 |
| butane | 5 |
| isobutane | 1.5 |

One gram of finely crushed catalyst is introduced into a Grignard reactor designed to effect hydrogenations under controlled pressure. The reactor is purged with nitrogen and then scavenged with a hydrogen stream. 100 cc of liquid olefinic cut, corresponding to about 1 gr-mol., are then introduced under pressure.

An efficient stirring device is used to suspend the catalyst powder in the reaction mixture. The progression of the hydrogenation is followed by the decrease of the hydrogen pressure in a container of known volume, thereby indicating the number of moles of consumed hydrogen and thus the corresponding number of moles of hydrogenated olefins.

The hydrogenation conditions are the following:

| Temperature | 40° C. |
|---|---|
| Pressure | 25 bars |

It is desired to hydrogenate practically all the olefins of the cut, i.e. at least 80% of the olefins present. The results are given in Table III. They are expressed as the number of hydrogen moles consumed in 6 minutes with a catalyst amount equivalent to 0.01 g of palladium.

TABLE III

| CATALYST | | DISPERSION (%) | MOLES OF $H_2$ CONSUMED IN 6 mn for 0.01 g of Pd |
|---|---|---|---|
| Example | 1* | 95 | 0.92 |
| | 2 | 50 | 0.49 |
| | 3 | 30 | 0.29 |
| | 4* | 85 | 0.80 |
| | 5 | 15 | 0.15 |
| | 6 | 32 | 0.32 |
| | 7* | 99 | 0.935 |
| | 8* | 100 | 0.93 |
| | 13 | 32 | 0.30 |

The hydrogenated products are analysed and found to contain the following percentages of saturated hydrocarbons (butane+isobutane):

TABLE IV

| CATALYST | BUTANE + ISOBUTANE (%) |
|---|---|
| Ex. 1* | 97.5 |
| 2 | 51.0 |
| 3 | 31.0 |
| 4* | 85.0 |
| 5 | 15.5 |
| 6 | 33.0 |
| 7* | 99.0 |
| 8* | 98.5 |
| 13 | 32.0 |

The difference to 100 consists of the olefins (butenes+isobutene) which have not been hydrogenated.

There is no formation of hydrocarbons other than those with 4 carbon atoms.

Only the catalysts of the invention are able to hydrogenate more than 80% of the olefins.

EXAMPLE 28: AROMATICS HYDROGENATION

The catalysts of example 18 and 19 are used to hydrogenate an aromatic dissolved in a normal paraffin: 20% of benzene in normal hexane.

A known amount of catalyst is introduced into a fixed bed reactor after dilution with silicon carbide. All traces of oxygen are removed from the reaction by scavenging with an inert gas (argon). A stream of hydrogen is then supplied to the reactor and the contents are reduced at 300° C. for 2 hours. The reactor temperature is then decreased to 80° C. The feed charge containing benzene and n-hexane is then injected in admixture with hydrogen. The reaction products are trapped and analyzed by gas phase chromatography. The activity is determined with respect to the resultant cyclohexane.

The operating conditions of the hydrogenation are:

P=1 bar
T=80° C.
WWH (weight of charge/weight of catalyst/hour)=8
$H_2$/HC molar ratio: 6

The results are following:

| Catalyst | Activity (mol/h/g of rhodium) |
|---|---|
| Example 18 | 1.20 |
| Example 19 | 0.22 |

It is clear that, although the dispersions do not differ greatly, the catalyst of the invention has a far higher activity for hydrogenating benzene.

This is probably due to the presence, in the catalyst of example 19, of chlorine supplied by the precursor or the competing ion.

The process of the invention is thus clearly better than the known processes.

EXAMPLE 29

The catalysts of examples 16 and 17 are used to hydrogenate a 20% benzene solution in normal hexane under the same conditions as used in example 28, except that the operating temperature is 100° C.

The results are the following:

| Catalyst | Activity (mol/h/g of platinum) $C_6H_{12}$ |
|---|---|
| Example 16 | 2.5 |
| Example 17 | 0.9 |

EXAMPLE 30

The catalysts of examples 20 and 22 are used to hydrogenate benzene in the same conditions as in example 29. The results are the following:

| Catalyst | Activity (mol/h/g of iridium) $C_6H_{12}$ |
|---|---|
| Example 20 | 1.00 |
| Example 22 | 0.42 |

EXAMPLES 31

The catalysts of examples 24 and 26 are used to hydrogenate benzene under the conditions of example 29. The results are the following:

| Catalyst | Activity (mol/h/g of ruthenium) $C_6H_{12}$ |
|---|---|
| Example 24 | 1.7 |
| Example 26 | 0.7 |

EXAMPLE 32-36

Example 18 has been repeated, except that benzene, used as the solvent for rhodium acetylacetonate, has been replaced by the following solvents:
cyclohexane
n-hexane
ethanol
acetylacetone
chloroform The final catalyst did not behave differently that the catalyst of example 18 in the test of example 28.

What is claimed is:

1. A process for manufacturing a supported group VIII noble metal catalyst, comprising the steps of:
    (a) contacting a catalyst carrier with a solution of at least one acetylacetonate of a group VIII noble metal in a solvent, said solvent being a hydrocarbon, an alcohol, a ketone or a halogenated hydrocarbon, so as to introduce said metal into said carrier; and
    (b) heating the metal impregnated carrier from step (a) to 100°-400° C. in the presence of a molecular oxygen containing gas, so as to remove the solvent and activate the impregnated carrier.

2. A process according to claim 1, wherein the product of step (b) is treated with hydrogen at a temperature of 100°-450° C.

3. A process according to claim 1, wherein the solvent is a hydrocarbon.

4. A process according to claim 1, wherein step (a) is performed with a solution in a hydrocarbon of at least one palladium, iridium or rhodium acetylacetonate, and step (b) is performed at 200°-400° C.

5. A process according to claim 1, wherein step (a) is performed with a solution of ruthenium acetylacetonate in a hydrocarbon and step (b) is performed at 100°-200° C.

6. A process according to claim 2, wherein the hydrogen treatment is performed at 100°-340° C.

7. A process according to claim 1, wherein the solvent of step (a) is an aromatic hydrocarbon.

8. A process according to claim 1, wherein step (a) is performed with a volume of solution amounting to 2 to 10 times the total pore volume of the carrier.

9. A process according to claim 1, wherein the catalyst carrier is a silica, an alumina or a silica-alumina having a surface of 5 to 500 $m^2/g$.

10. A catalyst prepared by the process of claim 1.

11. A process according to claim 1, wherein said catalyst is prepared substantially in the absence of chloride ions.

12. A process according to claim 1, wherein the resultant catalyst has a group VIII noble metal content of 0.05-2% by weight.

13. A process according to claim 2, wherein at least 50% of the deposited metal of the resultant reduced activated catalyst is accessible to reactants.

14. A process according to claim 2, wherein the deposited metal is present as crystallites smaller than about 20 Angstroms.

15. A process according to claim 2, wherein the resultant catalyst has a group VIII noble metal content of 0.05-2% by weight.

16. A process according to claim 2, wherein the resultant catalyst has no crystallites of group VIII noble metal detectable by transmission electron microscopy capable of detecting crystallites of a diameter of 10 Angstroms or higher.

17. A process according to claim 1, wherein step (a) is performed with a solution in a hydrocarbon of platinum acetylacetonate.

18. A catalyst according to claim 10, wherein said process further comprises the step of treating the activated catalyst resulting from step (b) with hydrogen at a temperature of 100°-450° C.

19. A catalyst according to claim 10, wherein the catalyst carrier is a silica, an alumina or a silica-alumina having a surface of 5 to 500 $m^2/g$.

20. A catalyst according to claim 18, wherein the resultant catalyst has a group VIII noble metal content of 0.05-2% by weight.

* * * * *